United States Patent
Reif

(12) 
(10) Patent No.: US 11,844,735 B2
(45) Date of Patent: Dec. 19, 2023

(54) WHEELCHAIR PUSH HANDLE ASSEMBLY

(71) Applicant: Nicholas Reif, Wichita, KS (US)

(72) Inventor: Nicholas Reif, Wichita, KS (US)

(*) Notice: Subject to any disclaimer, the term of this patent is extended or adjusted under 35 U.S.C. 154(b) by 189 days.

(21) Appl. No.: 17/407,654

(22) Filed: Aug. 20, 2021

(65) Prior Publication Data

US 2021/0378893 A1    Dec. 9, 2021

(51) Int. Cl.
*A61G 5/10*    (2006.01)
*F16B 7/10*    (2006.01)

(52) U.S. Cl.
CPC .............. *A61G 5/10* (2013.01); *F16B 7/105* (2013.01)

(58) Field of Classification Search
CPC ........... B62B 5/065; B62B 9/206; A61G 5/10; A61G 5/1051; A45B 2009/007; A63C 11/221; Y10T 403/32483
See application file for complete search history.

(56) References Cited

U.S. PATENT DOCUMENTS

| | | | | |
|---|---|---|---|---|
| 2,229,475 A | * | 1/1941 | Redmer | F16B 7/105 248/188.5 |
| 2,722,970 A | * | 11/1955 | Stechmann | A47C 3/26 248/408 |
| 4,211,309 A | | 7/1980 | Ruggiero | |
| 4,288,102 A | * | 9/1981 | Ramer | A63C 11/222 280/821 |
| 4,341,381 A | | 7/1982 | Norberg | |
| 4,360,213 A | * | 11/1982 | Rudwick | A61G 5/128 403/313 |
| 4,375,295 A | | 3/1983 | Volin | |
| 4,805,925 A | * | 2/1989 | Haury | A61G 5/1097 403/380 |
| 4,813,693 A | * | 3/1989 | Lockard | A61G 5/125 280/42 |
| 4,989,890 A | * | 2/1991 | Lockard | A61G 5/128 280/42 |

(Continued)

FOREIGN PATENT DOCUMENTS

WO    WO2020/223819    11/2020

OTHER PUBLICATIONS

"Push Handles Adjustable Height" colourswheelchair.com Mar. 11, 2014 http://colourswheelchair.com/accessories.

(Continued)

*Primary Examiner* — Emma K Frick
(74) *Attorney, Agent, or Firm* — Kenneth H. Jack; Davis & Jack, L.L.C.

(57) ABSTRACT

A wheelchair push handle assembly incorporating a chair back having right and left loops, and an upper end; right and left upwardly opening tubes respectively received within the right and left loops; right and left eyes opening the right and left tubes, wherein the eyes overlie the chair back's loops; right and left "L" members having hollow bored columns within the right and left tubes; right and left series of apertures opening the right and left columns' hollow bores; right and left series of latch pins received within the right and left series of apertures; and right and left series of springs mounted within the right and left columns' hollow bores, wherein each spring is connected to one of the latch pins, wherein one of the right latch pins engages the right eye, and wherein one of the left latch pins engages the left eye.

9 Claims, 4 Drawing Sheets

(56) References Cited

U.S. PATENT DOCUMENTS

| | | | |
|---|---|---|---|
| 5,044,650 A * | 9/1991 | Eberle, Jr. | B62B 9/20 280/47.38 |
| 5,074,574 A | 12/1991 | Carwin | |
| 5,383,585 A * | 1/1995 | Weiss | B62B 7/12 280/30 |
| 5,697,628 A | 12/1997 | Spear | |
| 5,915,712 A * | 6/1999 | Stephenson | A61G 5/1054 16/422 |
| 6,328,048 B1 | 12/2001 | Rivera, Sr. | |
| 6,854,916 B2 * | 2/2005 | Hsieh | F16B 7/105 403/109.1 |
| 7,011,335 B2 * | 3/2006 | Kight | B62B 9/20 280/647 |
| 7,134,359 B2 | 11/2006 | Lin | |
| 7,179,200 B1 | 2/2007 | Wu | |
| 7,500,689 B2 * | 3/2009 | Pasternak | A61G 5/1094 297/188.08 |
| 8,070,232 B2 * | 12/2011 | Hung | A61G 5/12 297/301.1 |
| 8,172,254 B2 * | 5/2012 | Park | B62B 5/065 280/47.38 |
| 8,234,755 B1 * | 8/2012 | Brand | A61H 3/04 16/427 |
| 8,678,425 B2 | 3/2014 | Schaaper et al. | |
| 9,192,541 B2 | 11/2015 | Liu | |
| 9,226,869 B2 | 1/2016 | Van Houtem et al. | |
| D766,140 S * | 9/2016 | Chun | D12/133 |
| 9,931,255 B2 * | 4/2018 | Haigh | A61G 5/10 |
| 10,028,872 B1 | 7/2018 | Chen | |
| 10,399,588 B1 | 9/2019 | Grantham, IV | |
| 10,717,183 B1 * | 7/2020 | LaHood | B25G 1/04 |
| 10,752,277 B2 * | 8/2020 | Haigh | B62B 5/064 |
| 10,799,406 B2 * | 10/2020 | Minardo | A61G 5/10 |
| 2003/0189361 A1 | 10/2003 | Chen et al. | |
| 2005/0211011 A1 * | 9/2005 | Victor | B62B 5/06 74/551.1 |
| 2010/0025969 A1 * | 2/2010 | Kent | A61G 5/1054 280/647 |
| 2016/0228312 A1 | 8/2016 | Quinn et al. | |
| 2018/0161224 A1 | 6/2018 | Forro | |
| 2019/0224549 A1 * | 7/2019 | Grant | A63B 69/002 |

OTHER PUBLICATIONS

"Akti Wheelchair" pressurecaremanagement.co.uk https://pressurecaremanagement.co.uk/products/akti?variant=1102970337.

"Kuschall Push Handles" kuschall.com Dec. 2, 2020 https://kuschall.com/ireland-en/accessories/push-handles/.

* cited by examiner

WHEELCHAIR PUSH HANDLE ASSEMBLY

FIELD OF THE INVENTION

This invention relates to wheelchairs. More particularly, this invention relates to wheelchairs which present push handles at the upper ends of their seat backs.

BACKGROUND OF THE INVENTION

Commonly known and commonly configured wheelchairs have a pair of or left and right push handles fixedly attached to the upper end of the wheelchair's back rest. Such handles commonly are commonly positioned upon the wheelchair at an approximate three feet elevation with respect to the ground. Such common three foot push handle elevation allows a man or woman of average height to easily and conveniently assist the wheelchair's rider by grasping the push handles while pushing the wheelchair and rider occupant up a ramp or incline plane. Alternatively, rearward pulling resistance applied to such handles allows the assistant to easily and efficiently guide the wheelchair as it rolls down a ramp or inclined plane.

In a situation where the wheelchair assistant is of above average height, the commonly positioned handles of such wheelchair may undesirably reside at a level below the assistant's waist, undesirably making it awkward for the assistant to push the wheelchair up the ramp or incline plane. Alternatively, where the assistant is of below average height, the assistant may encounter difficulties in effectively pulling upon the handles while guiding the wheelchair and rider down a ramp or inclined plane.

The instant inventive wheelchair push handle assembly solves or ameliorates problems, defects, and deficiencies of common wheelchairs discussed above by providing specially adapted and configured movable left and right handles which allow for selective adjustment of the height of the handles above the ground.

BRIEF SUMMARY OF THE INVENTION

A first structural component of the instant inventive wheelchair push handle assembly comprises a wheelchair chair back having left and right sides. In a preferred embodiment, the invention's wheelchair chair back component comprises a sling type chair back which is composed of durable fabric or woven canvas.

Further structural components of the instant inventive assembly comprise left and right loops or hems which are formed at the chair back's right and left sides. In the preferred embodiment, such loops or hems form tubular channels which extend from the lower ends of the chair backs right and left sides to the sides' upper ends.

Further structural components of the instant inventive assembly comprise right and left structural tubes which are received within and which preferably vertically extend through the chair back's right and left loops or hems. In a preferred embodiment, the assembly's right and left tube components comprise rigid structural members of the wheelchair.

Further structural components of the instant inventive assembly comprise right and left eye openings which extend through the walls of the right and left structural tubes. In the preferred embodiment, such right and left eyes are positioned upon the tubes at a location immediately above or overlying the upper ends of the right and left loops.

Further structural components of the instant inventive assembly comprise right and left "L" members, each having a column portion or component, and each having a foot portion or component. Upon vertical inversions of the "L" members, the foot portions advantageously function as handles. In the preferred embodiment, the column components of the "L" members are tubular or hollow bored.

Further structural components of the instant inventive wheelchair assembly comprise right and left pluralities of latch pins which are respectively operatively mounted within the column portions of the right and left "L" members. Such pin mounts preferably comprise right and left series of pin receiving apertures which are vertically aligned, and which open the columns' hollow bores. Such aperture series receive the right and left pluralities of latch pins, and right and left pluralities of "V" springs are preferably mounted within the column bores to operatively hold the latch pins within their apertures. The right and left "V" springs operatively outwardly biasing the latch pins through their apertures series.

In operation of the instant inventive wheelchair assembly, an operator or wheelchair assistant may easily and conveniently manually depress selected latch pins in order to upwardly or downwardly adjust the heights of the "L" members, advantageously adjusting the heights of the right and left handles.

Accordingly, objects of the instant invention include the provision of a wheelchair push handle assembly which incorporates structures as described above, and which arranges those structures in relation to each other in manners described above, for the performance of beneficial functions, as described above.

Other and further objects, benefits, and advantages of the instant invention will become known to those skilled in the art upon review of the Detailed Description which follows, and upon review of the appended drawings.

STATEMENT REGARDING CHARACTER OF DRAWINGS

Drawing FIGS. 1, 3, 4, and 5 are photographic in character. The Applicant asserts that these figures are sufficiently descriptive and have sufficient clarity to facilitate examination of the application. The Applicant requests that any requirement that these drawing figures be replaced by black line drawings showing the same structures be held in abeyance until completion of examination of the application. The Applicant asserts that 37 C.F.R. 1.84(b) (1) (4$^{th}$ sentence) and MPEP 608.02 (VII) (B) tacitly recognize the Examiner's discretion to hold a drawing replacement requirement in abeyance.

DETAILED DESCRIPTION OF A PREFERRED EMBODIMENT

Figure 1:
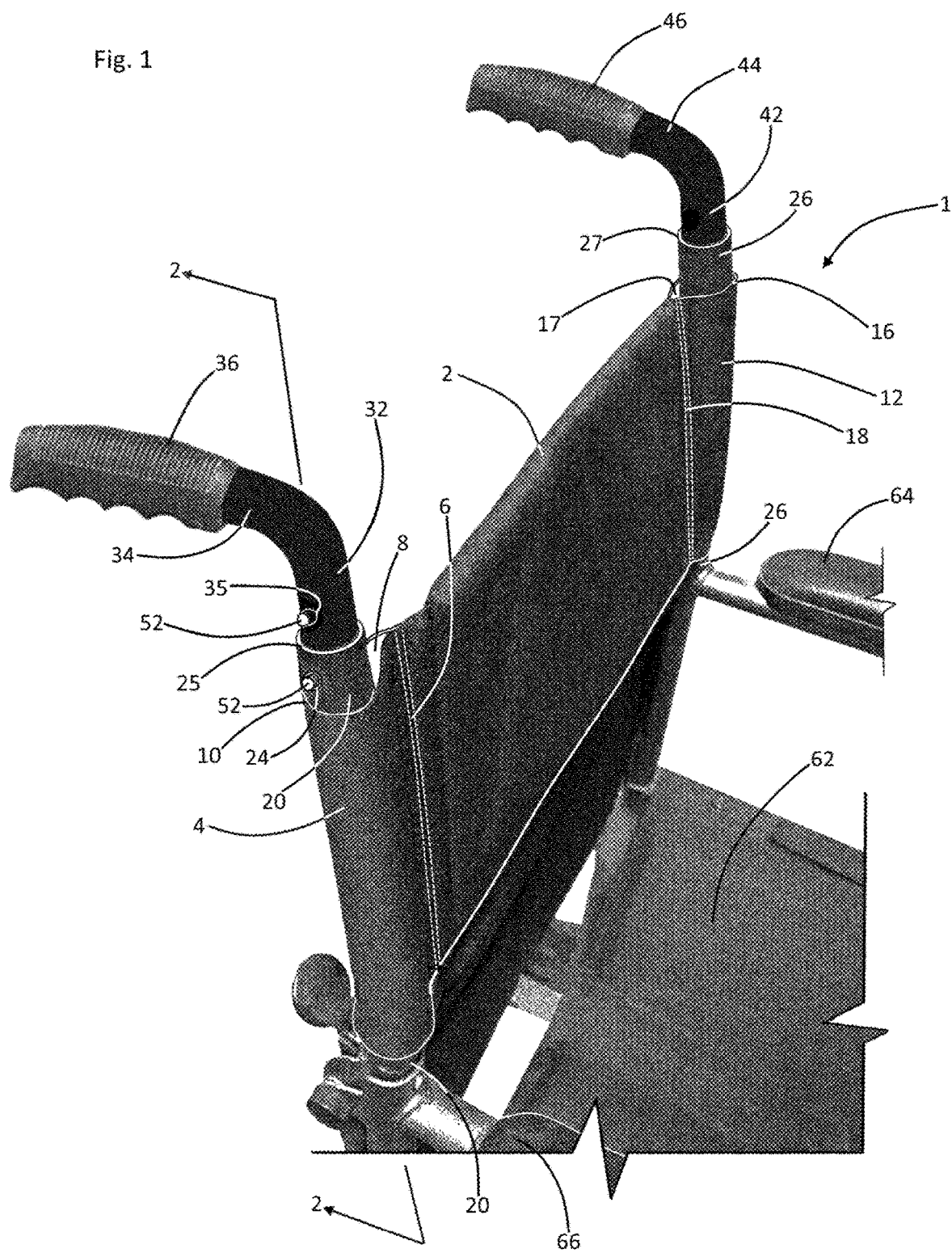
FIG. 1 is a partial perspective view of a preferred embodiment of the instant inventive wheelchair push handle assembly.

Referring now to the drawings and in particular to Drawing FIG. 1, a preferred embodiment of the instant inventive wheelchair push handle assembly is referred to generally by Reference Arrow 1. The wheelchair which includes the depicted assembly conventionally includes and incorporates a seat 62 and right and left arm rests 66 and 64, the wheelchair's wheels not being within view.

A first structural component of the instant inventive wheelchair push handle assembly comprises a chair back 2. While the chair back 2 may suitably be composed of a rigid or relatively inflexible material, the chair back 2 preferably is cushioned and is configured as a flexible sling or strap which is composed of woven fabric or canvas, such chair back 2 preferably being laterally oblongated.

Further structural components of the instant inventive assembly comprise right and left loops or hems 4 and 12 which are preferably tubular, forming and presenting vertically extending hollow bores or channels 8 and 17 which open upwardly and downwardly at the upper and lower ends of the chair back 2. Where the loops 4 and 12 are configured as hems, such loops are preferably formed and secured by right and left lines of stitching 6 and 18.

Further structural components of the instant inventive assembly comprise right and left structural tubes 20 and 26, such tubes having hollow bores. Tubes 20 and 26 necessarily open upwardly for receipt of and for engagement with other structures of the assembly which are further described below. In a preferred embodiment of the instant assembly, the right and left tubes 20 and 26 form and comprise rigid upwardly extending components of the wheelchair's right and left weldments which form the wheelchair's right and left frame or chassis components.

Figure 2:
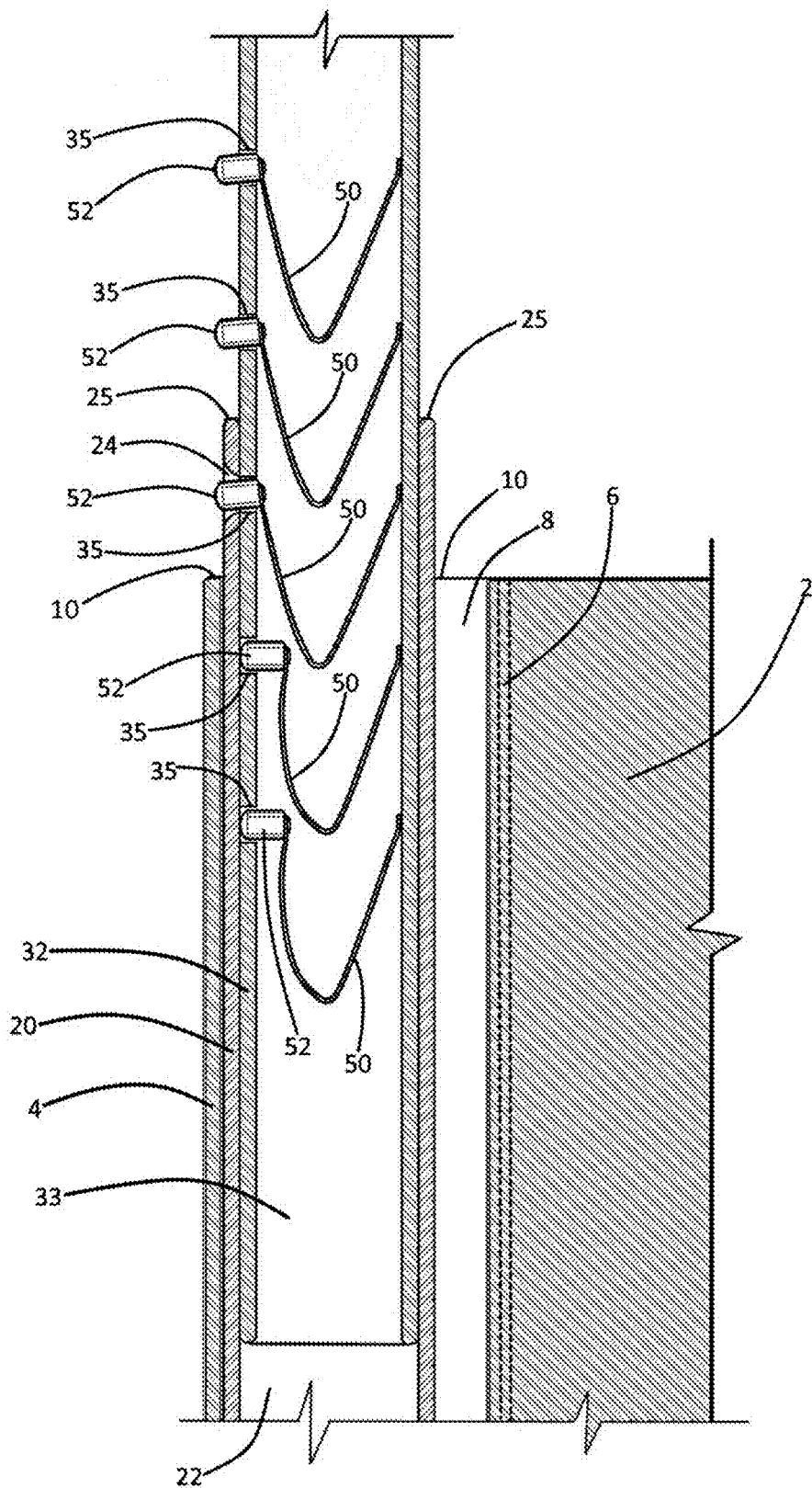
FIG. 2 is a partial sectional view, as indicated in FIG. 1.

The right and left tubes 20 and 26 are preferably specially modified to present right and left pin engaging eyes. Referring simultaneously to FIGS. 1 and 2, the assembly's right pin engaging eye 24 laterally opens the hollow bore 22 of the right tube 20, such eye communicating with such bore. A similar though mirroringly configured left pin engaging eye similarly oppositely laterally opens and communicates with the hollow bore of the left tube 26.

The assembly's pin engaging eyes are necessarily positioned near the upper ends of the right and left tubes 20 and 26 so that they open above the upper ends 10 and 16 of the right and left hems or loops 4 and 12. Such vertical positioning allows a wheelchair assistant operator of the instant inventive assembly to access the pin engaging eyes via localized applications of fingertip pressure without interference with the underlying fabric of the back loops 4 and 12. As indicated in FIG. 2, the annular walls or edge surfaces of the right and left pin engaging eyes (each represented by eye 24) are preferably outwardly chamfered or beveled to consonantly or consistently match the common annular chamfer or bevel of an operator's fingertip (not depicted within views).

Figure 4:
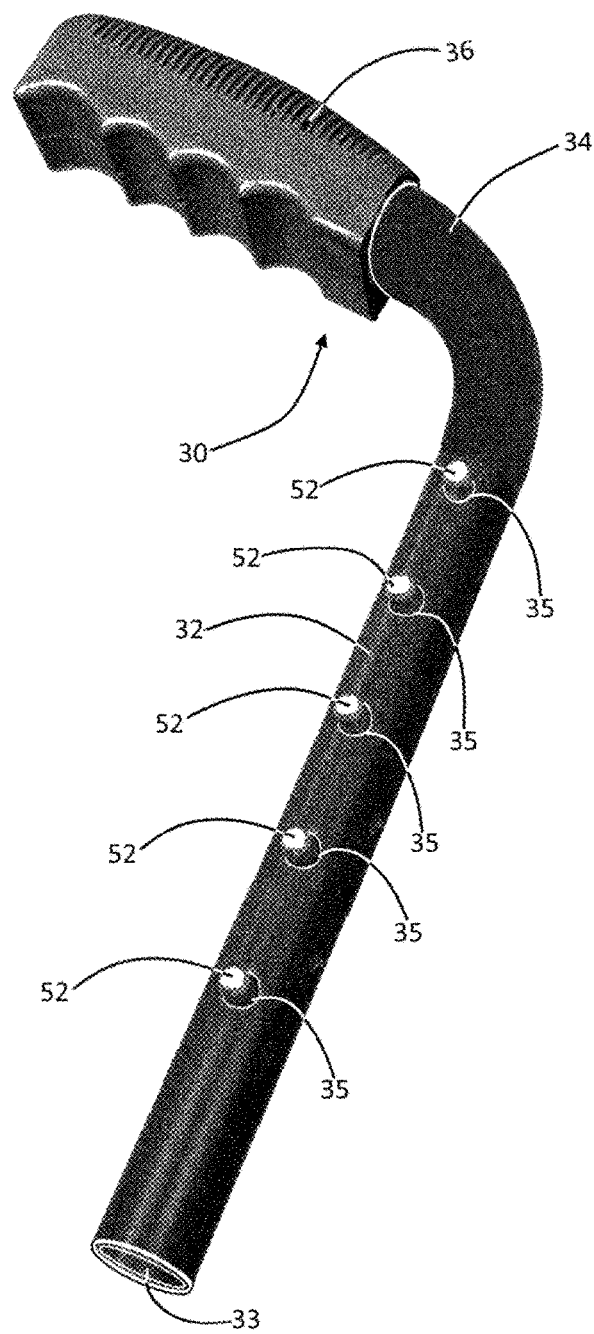
FIGS. 4 and 5 redepict right and left "L" member components of the FIG. 1 structure, the views of FIGS. 4 and 5 showing such components removed from the assembly of FIG. 1.
Figure 5:
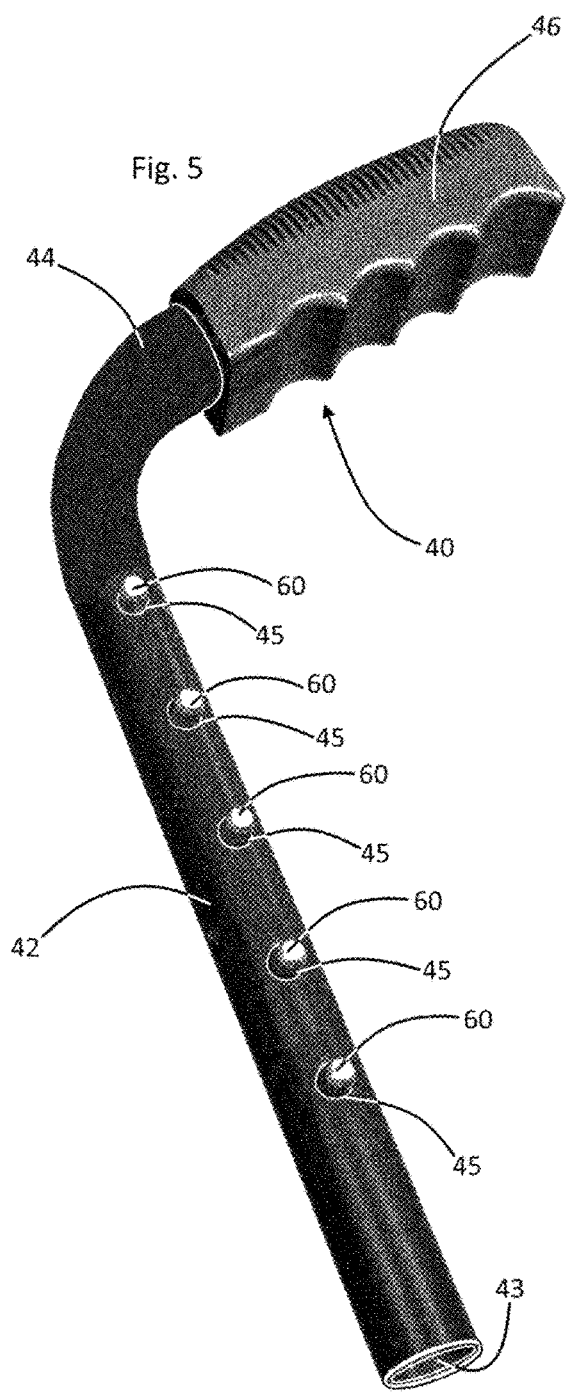

Referring simultaneously to FIGS. 1 and 4, further structural components of the instant inventive assembly comprise right and left "L" members which are respectively referred to generally by Reference Arrows 30 and 40. Similarly with the common components or parts of a capital letter "L", the right and left "L" members 30 and 40 respectively comprise right and left column portions 32 and 42. The "L" members' columns are preferably tubular, advantageously forming and presenting vertically extending hollow bores 33 and 43. In the preferred embodiment, the right and left column members 33 and 43 are closely fitted for receipts within the tubes' upper openings 25 and 27, and for sliding downward insertions into and respective nesting receipts within their underlying hollow bores.

Also consistently with the components of a capital letter "L", each of the right and left "L" members 30 and 40 further comprises a handle functioning portion, the right "L" member 30 having a foot or handle portion 34, and the left "L" member 40 having a foot or handle portion 44. Hand grip sleeve 36 and 46 are slidably and fixedly mounted over such foot/handles, such sleeves 36 and 46 preferably being securely attached by adhesive bonds.

Referring simultaneously to FIGS. 1, 2, and 4, further structural components of the instant inventive assembly comprise right and left series of pin mounting apertures. With respect to the right tubular column 32, a series of a right series of pin mounting apertures is exemplified by five vertically arrayed apertures 35 which communicate with and further open such column's hollow bore 33. A mirroringly configured left series of pin mounting apertures 45 similarly communicates with and opens the hollow bore 43 of the left tubular column 42.

Further structural components of the instant inventive assembly comprise right and left series of latch pins 52 and 60, the pins of each such series preferably being cylindrically configured and having arcuately curved outward surfaces for assistance with lateral pin deflections upon sliding across pine apertures, and for promotion of comfortable finger pressure contact. In the preferred embodiment, the outside diameters of latch pin 52 and 60 is fitted for insertion into and slidable retentions within one of the apertures among the right and left series of pin mount apertures 35 and 45.

Further structural components of the instant inventive assembly comprise right and left series of springs, the right series of springs being operatively mounted within the hollow bore 33 of the right tubular column 32, and the left series of springs being operatively mounted within the hollow bore 43 of the left tubular column 42. Referring in particular to Drawing FIG. 2, "V" springs 50 represent a preferred configuration of the assembly's right spring series component. The right leg of each "V" spring 50 is preferably fixedly attached to the inner end of one of the latch pins 52, while the opposite leg of said each spring biases against the opposite wall of the hollow bore 33. The springs' lateral biasing actions against their pins assures that each of the latch pins 52 is effectively permanently mounted for lateral reciprocating motions within its pin mounting eye 35.

A mirroringly configured series of "V" springs (not depicted within views) is similarly mounted within the hollow bore 43 of the left tubular column 42. Such left series of "V" springs similarly leftwardly biases against and holds the left latch pins 60 within the left series of pin mounting apertures 45.

Figure 3:
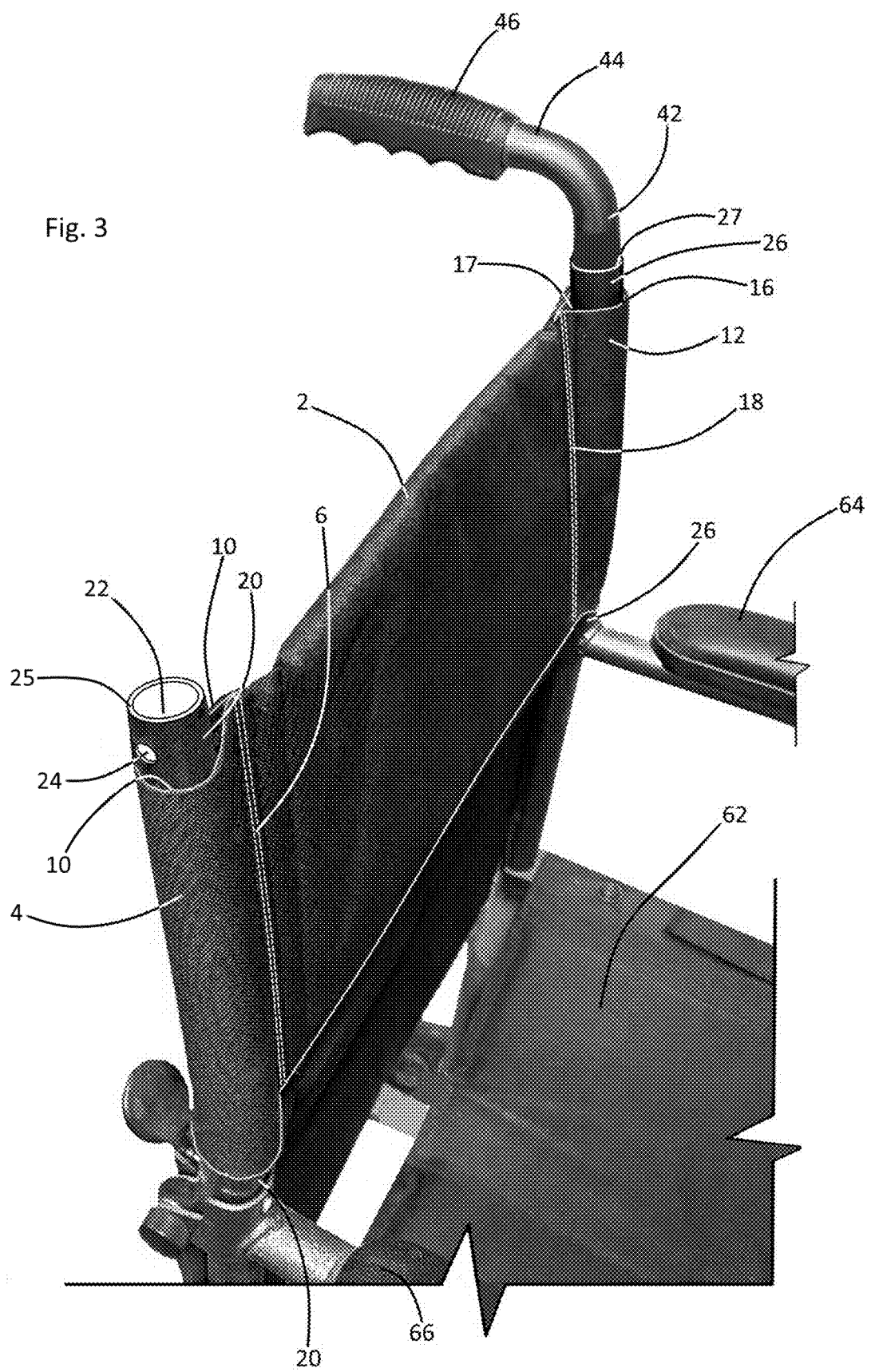
FIG. 3 redepicts the structure of FIG. 2, the view of FIG. 3 showing a right "L" member component removed.

In operation, the instant inventive assembly may be initially configured as indicated in Drawing FIG. 3. Where, for example, a wheelchair assistant operator of the assembly is of above average height, such operator may, referring further simultaneously to FIG. 4, grasp "L" member 30 by its handle 34,36, and may position such "L" member so that its column 32 upwardly overlies and aligns with the upper opening or lip 25 of the hollow bore 22 of the right structural tube 20. Thereafter, the operator may downwardly move the "L" member 30 until the lower end of such member's tubular column 32 enters the upper opening 25 of the right tube's hollow bore 22.

Thereafter, the operator may downwardly slidably move the right "L" member's column 32 within the right tube 20 until the lowermost latch pin 52 biases against the upper circular lip 25. Thereafter, the operator may apply oppositely lateral finger pressure to the outer or rightward end of such lowermost latch pin 52, such pressure driving such pin leftwardly against its tube bore mounted "V" spring 50. Such pressure moves the latch pin 52 leftwardly until its curved rightward outer end immediately overlies the inner peripheral edge of tube lip 25.

Thereafter, the operator may slightly move the right "L" member downwardly, causing the lowermost latch pin 52 to further leftwardly deflect and to completely reside within the hollow bore 22 of the right tube 20.

Thereafter, the operator may further slidably move the right "L" member 30 downwardly until the lowermost latch pin rightwardly moves and snaps into place within the right pin engaging eye 24.

Where the lowermost latch pin 52 engages eye 24, the right "L" member 30 is effectively secured at a highest elevation with respect to the ground, such position accommodating the above average height operator. Where the operator is of a lesser height, the operator may choose to repeat the finger pressing and "L" member sliding steps described above with respect to overlying springs and latch pins. Accordingly, the right "L" member may be alternatively secured at an intermediate height as represented by Drawing FIG. 2. Where the operator is of below average height, the uppermost latch pin 52 may be similarly manipulated into engagement with the pin engaging eye 24, such engagement situating the handle 34,36 of the right "L" member 30 at a lowest elevation. Similar manipulations and adjustments of the left "L" member 42 and its latch pins 60 may similarly adjust the height of the left handle 44,46 at various desired elevations with respect to the ground.

In order to ergonomically lift and raise the depicted wheelchair rearwardly over an obstacle such as a curb, the right "L" member 30 may be rotated 180° and may be engaged within the left tube 26 so that the uppermost latch pin 52 leftwardly engages left tube's pin engaging eye. Correspondingly, upon such needed rearward lifting, the left "L" member 40 may be similarly rotated 180° and may be mounted within the hollow bore 22 of the right tube 20, such reversed mount allowing the uppermost latch pin 60 to rightwardly engage the pin engaging eye 24. Thereafter, upward and rearward pulling forces applied the rotated and oppositely installed "L" members 30 and 40 may proceed. Upon such alternative mode of installations of the "L" 30 and 40 members, the upward and rearward lifting forces may be advantageously aligned along a wheelchair rider's center of mass. Following execution of such lifting operation, the right and left "L" members may be reconfigured and reinstalled as indicated in FIG. 1, such handle reconfiguration preferably being selectively adapted in accordance with the height of the wheelchair operator assistant.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A wheelchair push handle assembly comprising:
   (a) a chair back having a right loop, a left loop, and an upper end;
   (b) right and left upwardly opening tubes, said tubes being respectively received within the right and left loops;
   (c) right and left fingertip access eyes, said eyes respectively opening the right and left tubes, said eyes respectively overlying the chair back's right and left loops;
   (d) a right "L" member having a hollow bored right column, said column being received within the right tube;
   (e) a left "L" member having a hollow bored left column, said column being received within the left tube;
   (f) right and left series of apertures respectively opening the right and left columns' hollow bores;
   (g) right and left series of latch pins respectively received within the right and left series of apertures; and
   (h) right and left series of springs respectively mounted within the right and left columns' hollow bores, wherein each spring among said series of springs is connected operatively to one of the latch pins, wherein one of the right latch pins engages the right eye, and wherein one of the left latch pins engages the left eye.

2. The wheelchair push handle assembly of claim 1 wherein each spring comprises a "V" spring.

3. The wheelchair push handle assembly of claim 2 wherein the right and left series of apertures respectively open rightwardly and leftwardly.

4. The wheelchair push handle assembly of claim 3 wherein the right and left series of latch pins respectively extend rightwardly and leftwardly from the right and left series of springs.

5. The wheelchair push handle assembly of claim 4 wherein the right and left series of latch pins further respectively extend rightwardly and leftwardly within the right and left series of apertures.

6. The wheelchair push handle assembly of claim 5 wherein the right and left series of springs respectively bias the right and left series of latch pins rightwardly and leftwardly within the right and left series of apertures.

7. The wheelchair push handle assembly of claim 1 wherein the chair back comprises flexible fabric.

8. The wheelchair push handle assembly of claim 7 wherein the right and left "L" members further comprise right and left handles.

9. The wheelchair push handle assembly of claim 8 further comprising right and left hand grips respectively fixedly attached to the right and left handles.

\* \* \* \* \*